United States Patent
Keller et al.

(10) Patent No.: US 6,496,689 B1
(45) Date of Patent: Dec. 17, 2002

(54) INDICATION OF CHARGING INFORMATION USING THE USSD MECHANISM

(75) Inventors: Ralf Keller, Würselen (DE); Guido Zavagli, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/249,800

(22) Filed: Feb. 16, 1999

(30) Foreign Application Priority Data

Feb. 17, 1998 (DE) .......................... 198 06 557

(51) Int. Cl.$^7$ ............................................. H04M 11/00
(52) U.S. Cl. ......................... 455/406; 455/432; 455/466
(58) Field of Search ................................. 455/406–408, 455/436, 432, 437, 438–439, 442, 445, 453, 466, 433

(56) References Cited

U.S. PATENT DOCUMENTS

| | | | |
|---|---|---|---|
| 5,301,223 A | | 4/1994 | Amadon et al. |
| 5,835,856 A | * | 11/1998 | Patel .......................... 455/406 |
| 5,995,822 A | * | 11/1999 | Smith et al. ................. 455/406 |
| 6,029,062 A | * | 2/2000 | Hanson ....................... 455/408 |
| 6,058,300 A | * | 5/2000 | Hanson ....................... 455/406 |
| 6,070,066 A | * | 5/2000 | Lundborg et al. ........... 455/406 |
| 6,094,644 A | * | 7/2000 | Hillson et al. ............... 705/400 |
| 6,192,244 B1 | * | 2/2001 | Abbadessa ................... 455/436 |

FOREIGN PATENT DOCUMENTS

| | | |
|---|---|---|
| DE | 4419651 C2 | 12/1995 |
| DE | 19608464 A1 | 9/1997 |
| EP | 0 597 638 A1 | 5/1994 |
| WO | WO 97/36437 | 10/1997 |
| WO | WO 97/37503 | 10/1997 |
| WO | WO 98/09453 | 3/1998 |
| WO | WO 98/21907 | 5/1998 |

OTHER PUBLICATIONS

Werner F. Fölling, "Mobile Datenund Telefaxübertragung in GSM–Netzen," Mobilkommunikation, pp. 558–563.
A. Mukisch, "D1—Das Mobilfunk–Netz der Deutschen Telekom Mobilnet," In: Unterrichtsblätter Jg. 49 Jun. 1996, pp. 288–297.
GSM Recommendation 02.86, Digital Cellular Telecommunications System, Advice of Charge (AoC) Supplementary Service—Stage 1, Nov. 1996.
GSM Recommendation 02.24, Digital Cellular Telecommunications System; Description of Charge Advice Information (CAI), Nov. 1996.
ETSI Specification 2.90/prETS 300625, European Digital Cellular Telecommunications System (Phase 2); Stage 1 Description of Unstructured Supplementary Service Data (USSD), Mar. 1994.
ETSI Specification 3.90/prETS 300549, Digital Cellular Telecommunications System (Phase 2); Unstructured Supplementary Service Data (USSD)—Stage 2, Jan. 1996.
ETSI Specification 4.90/prETS 300572, European Digital Cellular Telecommunications System (Phase 2); Unstructured Supplementary Service Data (USSD)—Stage 3, Nov. 1994.

* cited by examiner

Primary Examiner—Edward F. Urban
Assistant Examiner—Charles Craver
(74) Attorney, Agent, or Firm—Burns, Doane, Swecker & Mathis, LLP

(57) ABSTRACT

To achieve an improved overview on service charges for a subscriber to a digital cellular communication network it is proposed to provide a mobile station with a charging indicating unit (6) adapted to receive charging information as unstructured supplementary service data messages (USSD) via the unstructured supplementary service data dialog. Therefore, it is possible to provide charging information without any impact on the hardware of the mobile station (MS). Further, as more detailed information on the kind of service and on the amount of data transferred is available a detailed estimate on the actual cost may be displayed to the user of the mobile station.

20 Claims, 10 Drawing Sheets

INDICATION OF CHARGING INFORMATION USING THE USSD MECHANISM

FIELD OF THE INVENTION

The present invention relates to the indication of charging information at a mobile station supporting unstructured supplementary service data according to the preamble of claim 1.

Further, the present invention relates to a digital cellular communication network comprising at least one public land mobile network according to the preamble of claim 10.

Finally, the present invention relates to a method to provide charging specific information in a digital cellular communication network supporting unstructured supplementary service data messages according to claim 19.

BACKGROUND OF INVENTION

Digital cellular communication systems meanwhile are in common use. One example for such a digital cellular communication system is the pan-European mobile telecommunication network GSM for which technical specifications have been elaborated by the European Telecommunication Standards Institute ETSI. Digital cellular communication systems allow its users to initiate and receive calls and services, respectively, at any geographical area within the radio coverage of the home public land mobile network HPLMN operated by the network operator selected by the subscriber and also within the radio coverage area of partners of the network operator providing services within the home public land mobile network, HPLMN, i.e. network operators having a roaming agreement with the HPLMN-network operator.

Basic sub-systems for the architecture of a digital cellular communication network are provided to establish services in a public land mobile network PLMN service area of a single network operator. These sub-systems comprise a base station sub-system BSS, a network and switching sub-system NSS and an operational sub-system OSS. The base station sub-system BSS provides and manages transmission paths between mobile stations MS and the network and switching sub-system NSS. The network and switching sub-system NSS manages communications and connections to the mobile stations MS.

FIG. 9 shows further components being related to the network and switching sub-system NSS, the base station sub-system BSS and the mobile station MS, respectively. In particular, FIG. 9 shows a public land mobile network PLMN that may either be the home public land mobile network HPLMN or the visiting public land mobile network VPLMN of a subscriber.

To achieve a link between two different PLMN service areas there is provided a gateway mobile service switching centre GMSC that serves to determine specific locations of a mobile station MS in the digital cellular communication system and to route calls towards a mobile station MS. In addition, an even more important task of the gateway mobile service switching centre GMSC is to connect to other networks.

As shown in FIG. 9, the gateway mobile service switching centre GMSC is connected to a functional unit called home location register HLR where two types of information are stored, i.e. subscriber information and mobile information to allow incoming calls to be routed to the mobile station MS. Any administrative action by the network operator with respect to mobile station data is carried out in the home location register HLR.

To route a call to a mobile station MS the gateway mobile service switching centre GMSC is also connected to a mobile service switching centre MSC through which the mobile station MS can obtain a service. The mobile service switching centre performs the necessary switching functions required for mobile stations MS covered by this mobile service switching centre MSC. Also, the mobile service switching centre MSC monitors the mobility of its mobile stations MS and manages necessary resources required to handle and update the location registration procedures.

As outlined above and shown in FIG. 9 the public land mobile network HPLNM/VPLMN comprises a plurality of mobile service switching centres MSC and respective service areas each covering a predetermined number of basic cells wherein a mobile station can move. To this end each mobile service switching centre MSC is connected to a visitor location register VLR. The visitor location register VLR is a functional unit that dynamically stores mobile station information, such as the location area in case the mobile station is located in the service area covered by the visitor location register VLR. When a roaming mobile station MS enters a service area assigned to a specific mobile service switching centre MSC the mobile service switching centre MSC informs the associated visitor location register VLR about the mobile station MS.

In addition, the base station sub-system BSS corresponds to physical equipment providing radio coverage to the above-mentioned cells which are approximately hexagonal geographical regions in FIG. 9. Each base station sub-system BSS contains equipment required to communicate with the mobile station MS.

In the digital cellular telecommunication network system there are three types of logical channels: traffic channel, control channel, and cell broadcast channel. The traffic channels are used to transmit user information like speech or data. The control channels are used to transmit control and signalling information. Finally, the cell broadcast channels are used to broadcast user information from a mobile services switching centre MSC to the mobile station MS listening in a given basic cell/basic service area.

Using the architecture of the digital cellular telecommunication network system outlined above, there may be provided a group of communication capabilities to the subscribers. The basic telecommunication services provided in the GSM digital cellular telecommunication network system are divided into three main groups: bearer services, teleservices, and supplementary services.

The bearer services give the mobile station MS the capacity required to transmit appropriate signals between certain user network interfaces such as data services, alternate speech/data, speech followed by data, clear 3.1 kHz audio service and support of automatic request for retransmission technique for improved error rates.

The teleservices provide the mobile station MS with necessary capabilities including terminal equipment functions to communicate with other mobile stations, e.g., short message services or message handling and storage services.

Finally, supplementary services modify or supplement basic telecommunication services and are provided with or in association with the basic teleservices. Such supplementary services comprise, e.g., number identification services, call offering services, call completion services, multi party services, or call restriction services.

In order to be able to deliver an incoming call to a mobile station on the basis of these different services it is necessary to know the location of the mobile station MS at any time. This is achieved through continuous data exchange between the mobile station MS and the base station sub-system BSS in the service area where the mobile station is located. Thus, the digital cellular telecommunication network system keeps track of the mobile station MS and stores location information in the respective home location register HLR and visitor location register VLR.

Generally, charges and tariffs for calls in cellular digital communication systems described so far are to a large extent not related to technical specifications but dealt with by system operators.

Usually the calling mobile station or the subscriber mobile station may receive information in real time about call-related costs through the Advice of Charge AoC supplementary service specified in ETSI Advice of Charge AoC supplementary services, GSM Recommendation 02.86, November 1996.

Firstly, this feature may be related to an approximate indication to what will appear on the bill in case a call would be finished at the time of the Advice of Charge. Charges are indicated for the call in progress when originating at the mobile station or for the roaming leg only when the call terminates at the mobile station. Usually, the mobile station MS receives at the beginning of each call a message as Charge of Advice Information defining the rate at which the call will be charged, time dependence, data dependence, and unit increments, see GSM 02.24, ETS 300 918, "Digital cellular telecommunications system, Phase 2+; General on supplementary services". The mobile station MS then indicates appropriate charges even when roaming based on HPLMN units. Also where applicable, the volume charge per packet data service is indicated in addition to the normal time dependent and incremental charges.

Secondly, the Advice of Charge supplementary service may be used to indicate the charge that will be made for the use of telecommunication services. This aspect is intended for aspects where the user is generally not the subscriber but is known to the subscriber and pays the subscriber rather than the service provider. Here, the charge is based as closely as possible on the charge that will be levied on the subscriber's bill in the home puplic land mobile network HPLMN.

However, in both cases accuracy of the Advice of Carge AoC supplementary service is a problem, e.g., in an international multi-operator environment when a user is roaming out of the network which holds his subscription. In particular, the roaming of a mobile station MS means that the PLMN handling a call and issuing the toll ticket is not necessarily the one that bills the subscriber such that the call charge and the bill charge are different, e.g., due to different currencies. Further, any charges for non-call related transactions and for certain supplementary services, e.g., call forwarding are not indicated.

Further, with existing mobile stations MS charging estimates are derived only on the basis on the time elapsed and indicate only the time used for a service but not the actual costs levied on the user of the mobile station MS.

Still further, the functionality being related to the Advice of Charge AoC supplementary service must be implemented to the mobile station MS, thus increasing the complexity and the costs for mobile stations. Therefore, no charge information will be provided to the user in case the mobile station MS does not support the Advice of Charge functionality and in particular in the second case the telecommunication service is prevented at all.

SUMMARY OF INVENTION

In view of the above, the object of the invention is to provide improved overview on service charges for a subscriber to a digital cellular communication network.

According to the present invention this object is achieved through a mobile station having the features of claim 1.

Therefore, it is possible to provide charging information without any impact on the hardware of the mobile station, i.e. without any extra hardware support required, e.g, for the Advice of Charge AoC supplementary service. The reason for this is that charging information may be provided through a network node of the digital cellular communication network wherein the mobile station is roaming so that charging information related functionality must not be provided at all in the mobile station.

Further, the provision of charging information is not restricted to the actual time used for a certain service. As more detailed information on the kind of service, on the amount of data transferred, on the location of the calling or called party may be transferred, a detailed estimate on the actual costs may be displayed to the user of the mobile station.

According to a preferred embodiment of the invention the charging indication information means is adapted to receive charging information at the beginning of a service, and then to terminate the transfer after confirmation of receipt thereof. Only in case charging information changes during a service the transfer charging information is re-established. This embodiment of the present invention is particularity adapted to long duration services where in addition the amount of unstructured supplementary service data messages should be minimized. Further, the dynamic adaptation of charging information allows for improved estimation accuracy, in particular during roaming between different charging areas.

According to a further preferred embodiment of the present invention the charging information is provided continuously from a network node to derive an estimate of service charges on the basis of time-specific, location-specific, or service-specific criteria, respectively. Therefore, the use of unstructured supplementary service data messages allows the provision of charging information without any particular implementation overhead at the mobile station side.

According to a further preferred embodiment of the invention the charging indication information means is adapted to simultaneously establish the transfer of unstructured supplementary data messages to indicate charging information provided through the local operator and charging information processed offline. This embodiment is particularity well adapted to a case where a user of a mobile station is roaming abroad with respect to the country where his home public land mobile network HPLMN lies. Here, it is possible to indicate to the user of the mobile station that part of the overall costs for a service will be charged to him and also to indicate an exact estimate of the costs for a service during roaming.

According to a further preferred embodiment of the present invention the charging information is received before establishment of a service to derive an estimate of service charges on the basis on time-specific, location-specific, or service-specific criteria, respectively. Therefore, the use of unstructured supplementary service data messages allows the provision and retrieval of charging information also in non-operative states of the mobile station, e.g., out of call.

According to a further preferred embodiment of the present invention the mobile station comprises location information indicating means adapted to identify a location information for a cell where the mobile station is currently roaming. The location information may then be output to a charging application via the unstructured supplementary service data dialogue means. This embodiment, too, takes into account that in case a calling mobile station has its home public land mobile network HPLMN in a different country than the called mobile station an overhead may appear in the routing if the called mobile station is actually roaming in the country of the home public land mobile network HPLMN of the calling mobile station. In such a case the service may be routed back and forth between the two home public land mobile networks HPLMN instead of using a national or even local link. To avoid this undesireable situation it is proposed to incorporate the location of the calling mobile station and the called mobile station into the provision of charging information. Preferably, the related location information is automatically updated during roaming of the calling and called mobile station to enable a call back feature in the mobile station MS.

Further, according to the present invention there is provided a digital cellular communication network having the features of claim 10 and 14, respectively.

The architecture of the inventive digital cellular communication network allows improved charging information without impact on the architecture of the mobile stations roaming therein. Corresponding to user preferences it is possible to select communication times that are cheaper, in particular for services not requiring immediate delivery, e.g., suplementary short message services SMS. Thus, the operator may attract calls by offering lower tariffs in low usage times.

Preferably, charging information is sent at regular intervals using the unstructured supplementary service data messages for automatic display at the mobile station so that the customer is continuously aware of the costs for services provided.

According to a further preferred embodiment of the present invention the mobile station MS roaming in the inventive digital cellular communication network is implemented as outlined above to handle local operator generated charging information and charging information processed offline, e.g., during call forwarding to the called mobile station MS. This embodiment of the present invention takes into account that the forwarding of services to a called mobile station and the charging therefore is usually executed in network nodes which therefore may best estimate related charging costs. Therefore, the mobile stations MS should only be adapted to receive the correct charging information, however, without any overhead to carry out an estimation of the charging costs in the mobile station MS itself. Further, it is possible to minimize the communication necessary for the indication of charging information since related tasks are executed at places where the information is immediately available.

Finally the advantages outlined above are also achieved with a method to provide charging specific information in a digital cellular communication network supporting unstructured supplementary service data messages according to claim 16.

BRIEF DESCRIPTION OF DRAWINGS

Preferred embodiments of the present invention will be described with respect the the enclosed drawing in which.

DESCRIPTION OF PREFERRED EMBODIMENTS

In the following preferred embodiments of the present invention will be described with reference to the enclosed drawing. According to the invention it is proposed to use the recently introduced extension to the digital cellular telecommunication network system specification with respect to supplementary services, i.e. the exchange of so-called unstructured supplementary service data USSD, to overcome the problems outlined with respect to the state of the art. In particular, according to the invention it is proposed to transfer charging information via communication channels established for unstructured supplementary service data USSD.

These unstructured supplementary service data USSD features have been specified in ETSI Technical Specification 2.90/prETS 300625, 3.90/prETS 300549, and 4.90/prETS 300572 as dedicated mechanism to exchange information between a mobile station MS and a network node application provided in a digital cellular telecommunication network system. Unstructured supplementary service data USSD exchange generally provides a transparent link between a mobile station MS and a node application running in either of the mobile service switching centre MSC, the visitor location register VLR or the home location register HLR that can at any time set up an USSD-dialogue to a mobile station MS. This operation can either be a request for information from the mobile station MS or a notification requiring no information from the mobile station MS.

Figure 1:
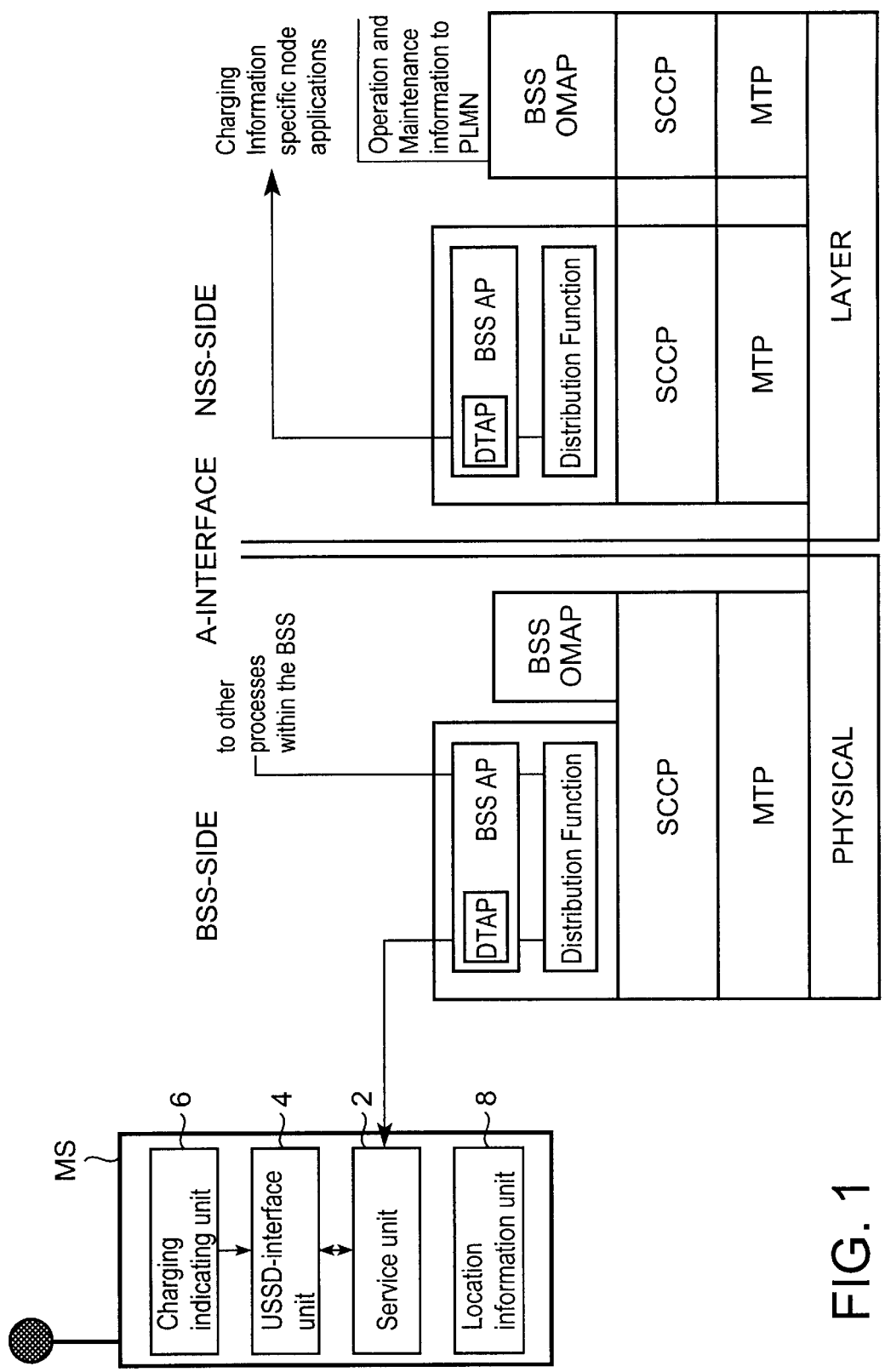
FIG. 1 shows a schematic diagram of the system architecture underlying the inventive embodiments.

FIG. 1 shows a schematic diagram of the system architecture underlying the different inventive embodiments for improved exchange of charging indication between the mobile station MS, the basic sub-system BSS and the mobile services switching centre MSC, and the visited or home public land mobile network, respectively.

As shown in FIG. 1, besides the usual physical transport layer on each side of an A-interface there is provided a message transfer part MTP and a signalling connection control part SCCP. The message transfer part MTP and the signalling connection control part SCCP are used to support communication to the mobile station MS and further contain additional conceptual entities such as the BSS operation and maintenance application part BSSAP which allows to transfer operation and maintenance messages and supports all procedures that require interpretation and processing of information related to single calls and resource management. The BSS management application part BSSAP comprises a direct transfer application part DTAP that is used to transfer call control and mobility management messages between the mobile services switching centre MSC and the mobile station MS. Also, USSD messages are always transferred at the BSS-side by the A-interface in the form DTAP messages. This enables the transfer of additional information such as charging information or position information, respectively.

As shown in FIG. 1, the mobile station MS comprises a service unit 2 to perform the bearer services, the teleservices and the supplementary services mentioned above. These services are established via the Direct Transfer Application Part DTAP for the transfer of call control and mobility management messages. An input/output unit (not shown) performs related man-machine interface functionalities at the mobile station MS.

As shown in FIG. 1, there is also provided an unstructured supplementary service data interface unit 4 to establish a transaction channel for unstructured supplementary data messages between the digital cellular communication network and the mobile station MS. These unstructured supplementary service data messages are, e.g., related to charging information provided by a network node. Further, location information may be forwarded to a network node actually carrying out the charging for an accurate determination of service related charges.

According to the invention, the unstructured supplementary service data interface unit 4 can be implemented as additional circuit in the mobile station MS. Another option for the realization of the unstructured supplementary service data interface unit 4 is a software-based implementation with the additional advantage that the charging information specific services have no impact on the hardware of the mobile station MS.

As shown in FIG. 1, the mobile station MS is also provided with a local information unit 8 to continuously store the base station identity code BSIC or any other location specific information, e.g., GPS-information, for the current location of the mobile station MS. This allows the implementation of charging services using an excat location information. In particular, this local information unit 8 activates the unstructured supplementary service data interface unit 4 to transfer, e.g., the base station identity code BSIC via unstructured supplementary service data interface unit 4 to the network node carrying out the charging. It should be noted that this inventive approach allows the retrieval of location information in all states of the mobile station MS, e.g., out of calling, during calling and so forth.

However, as outlined above, according to the present invention the retrieval of location information with respect to the roaming mobile station MS clearly is not restricted to the use of the base station identity code BSIC but may be implemented using any generally available location management facility. One typical example for such a facility would we the global positioning system GPS or any other related system.

As shown in FIG. 1, the mobile station MS also comprises a charging indication unit 6 to either receive charging information as unstructured supplementary data messages USSD via the unstructured supplementary service data interface unit 4 from a network node or to calculate exact charging information on the basis of transferred charging information and the location information provided through the location information unit 8.

Figure 2:
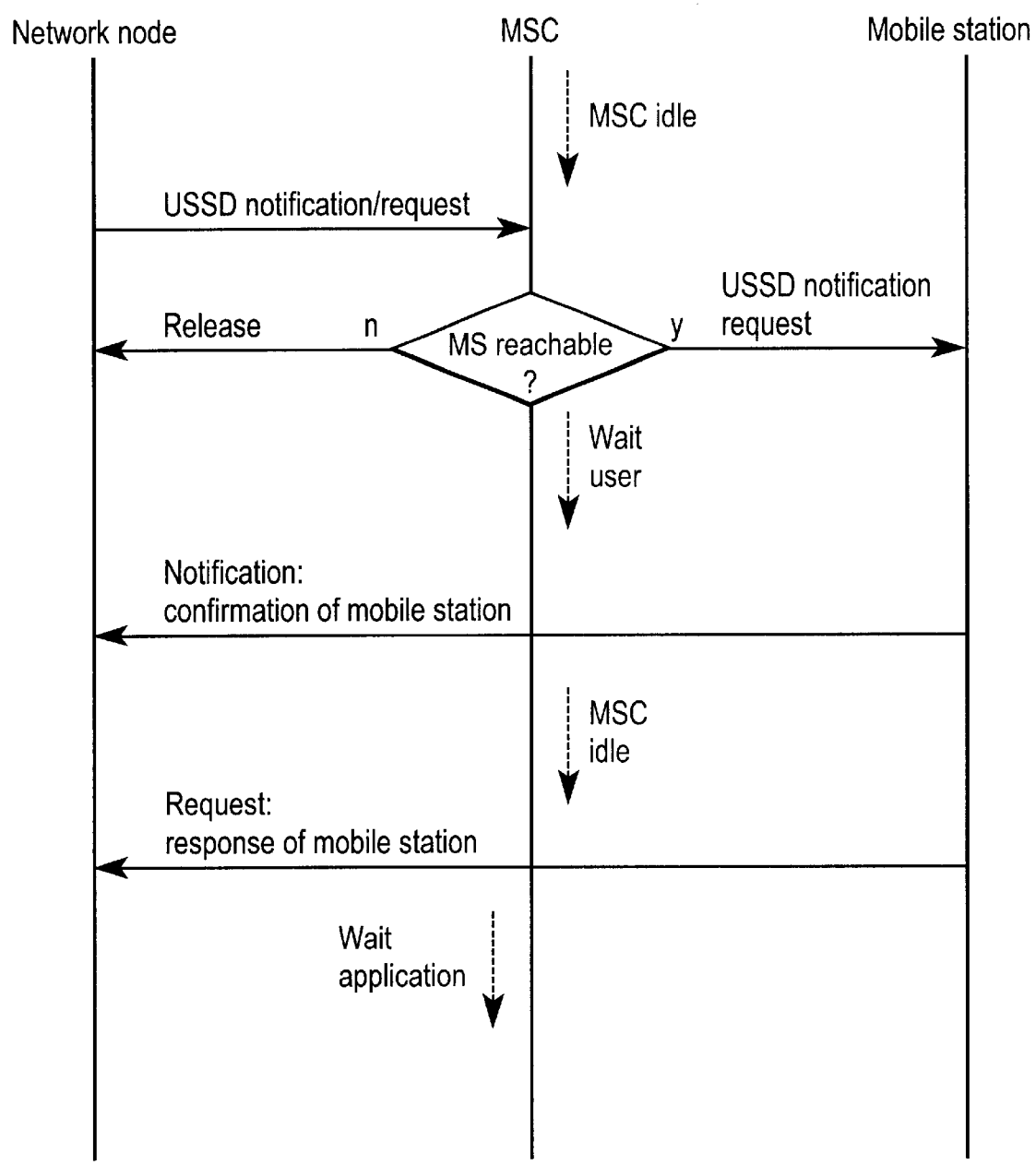
FIG. 2 shows the handling of unstructured supplementary service data dialogues in general.

FIG. 2 shows the handling of network initiated USSD-notification. When an application in a network node, e.g., the home location register HLR is to send an USSD-notification to a mobile station MS it sets up a dialogue to the mobile station MS and sends the notification to the mobile station MS. It then waits for a response. Here, the network node is responsible for controlling the USSD-dialogue and shall therefore release the dialogue when it receives a confirmation of the request from the mobile station MS.

FIG. 2 also shows an application where a network node sends an USSD-request to the mobile station MS. Here, the network node, e.g, the visitor location register VLR sends the request to the mobile station MS and awaits a response. The network node is responsible for controlling the USSD-request and therefore normally releases the application when it receives a response from the mobile station MS.

According to the present invention, typical cases relate to network applications running in either of the home location register HLR, vistor location register VLR, mobile services switching centre MSC, and gateway mobile service switching centre GMSC, respectively. Usually charging procedures send a USSD-request or notification to a mobile station MS. Further, unstructured supplementary data operations can be initiated either by the mobile station MS or from any of these network nodes.

Figure 3:
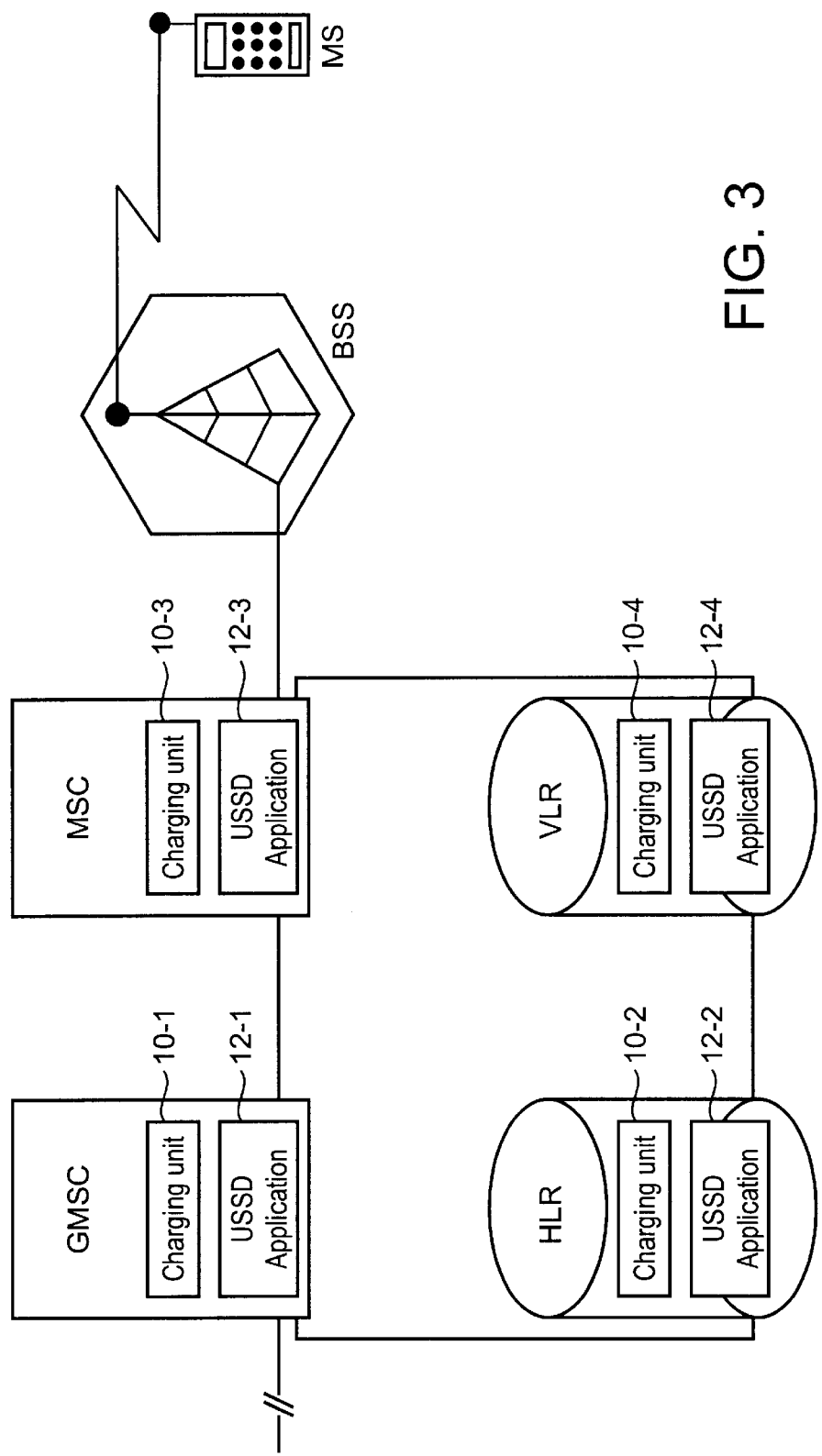
FIG. 3 shows the determination and transfer of charging information at different network nodes according to the present invention.

Using the system architecture shown in FIG. 1 and the USSD-notifications and request shown in FIG. 2 the exchange of charging information is carried out as shown in FIG. 3.

Here, every network node, i.e. home location register HLR, visitor location registor VLR, mobile services switching centre MSC, and gateway mobile service switching centre GMSC, respectively, comprises a charging unit 10-1, 10-2, 10-3, 10-4 and a USSD-application unit 12-1, 12-2, 12-3, 12-4. With a USSD-notification the mobile services switching centre MSC checks on whether the mobile station MS is reachable or not and then either transfers the USSD-notification to the mobile station MS or releases the USSD-dialogue with the network node. As shown in FIG. 3, the charging units 10-1, 10-2, 10-3, 10-4 calculate charging information and transfer it to the mobile station MS using the unstructured supplementary service data messages USSD. In dependence on national requirements and charging regulations a coordination of the charging of the charged fees by means of the charging units 10-1, 10-2, 10-3, 10-4 may be necessary.

According to the present invention not every network node must be provided with a charging unit 10-1, 10-2, 10-3, 10-4 or an USSD application unit 12-1, 12-2, 12-3, 12-4 but it is sufficient if at least one network node may carry out the functions necessary for the indication of charging information. However, a USSD charging application running a mobile service switching center MSC may only reach the mobile stations MS currently roaming in the area controlled by this mobile service switching center MSC.

In the following the indication of charging information through USSD-dialogue will be explained in more detail with respect to FIG. 4 to FIG. 7.

Figure 4:
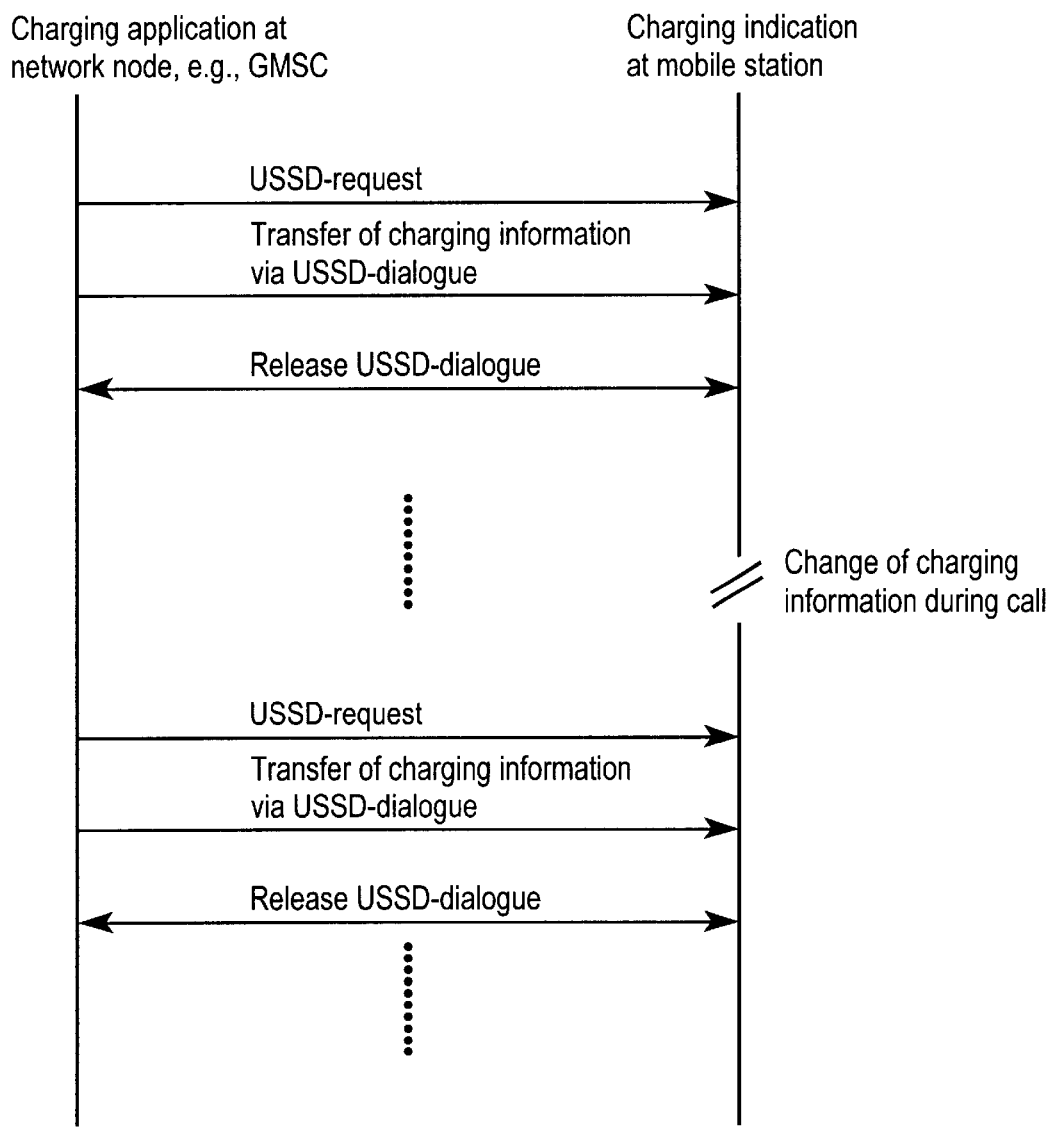
FIG. 4 shows the indication of charging information using unstructured supplementary service data dialogues according to a first embodiment of the present invention.

According to the embodiment of the present invention shown in FIG. 4 the charging unit 10-1, 10-2, 10-3, and 10-4 of at least one network node and the charging indication unit 6 at the mobile station MS exchange charging information as unstructured supplementary service data USSD at the beginning of a service. Here, it should be noted that the transfer of charging information may begin with the first USSD request message and in specific cases one USSD message will be sufficient anyway. Finally the transfer of the unstructured supplementary data messages is terminated after confirmation of receipt of the charging information, and the actual costs of a service for presentation to the user are calculated in de-centralized manner in the charging indication unit 6.

Further, in the embodiment shown in FIG. 4 the charging indication unit 6 re-establishes the transfer of unstructured supplementary service data USSD in case charging information is changing during a service. One typical example would be that either the calling or the called party is roaming abroad so that additional charges levied for forwarding the call should be indicated to the user.

Thus, the embodiment shown in FIG. 4 enables an online overview of charges caused by a call which is most useful for long data services/calls. Further, the most exact charging information is provided and not only charging units in the HPLMN or used time as with Advice of Charge AoC.

Figure 5A:
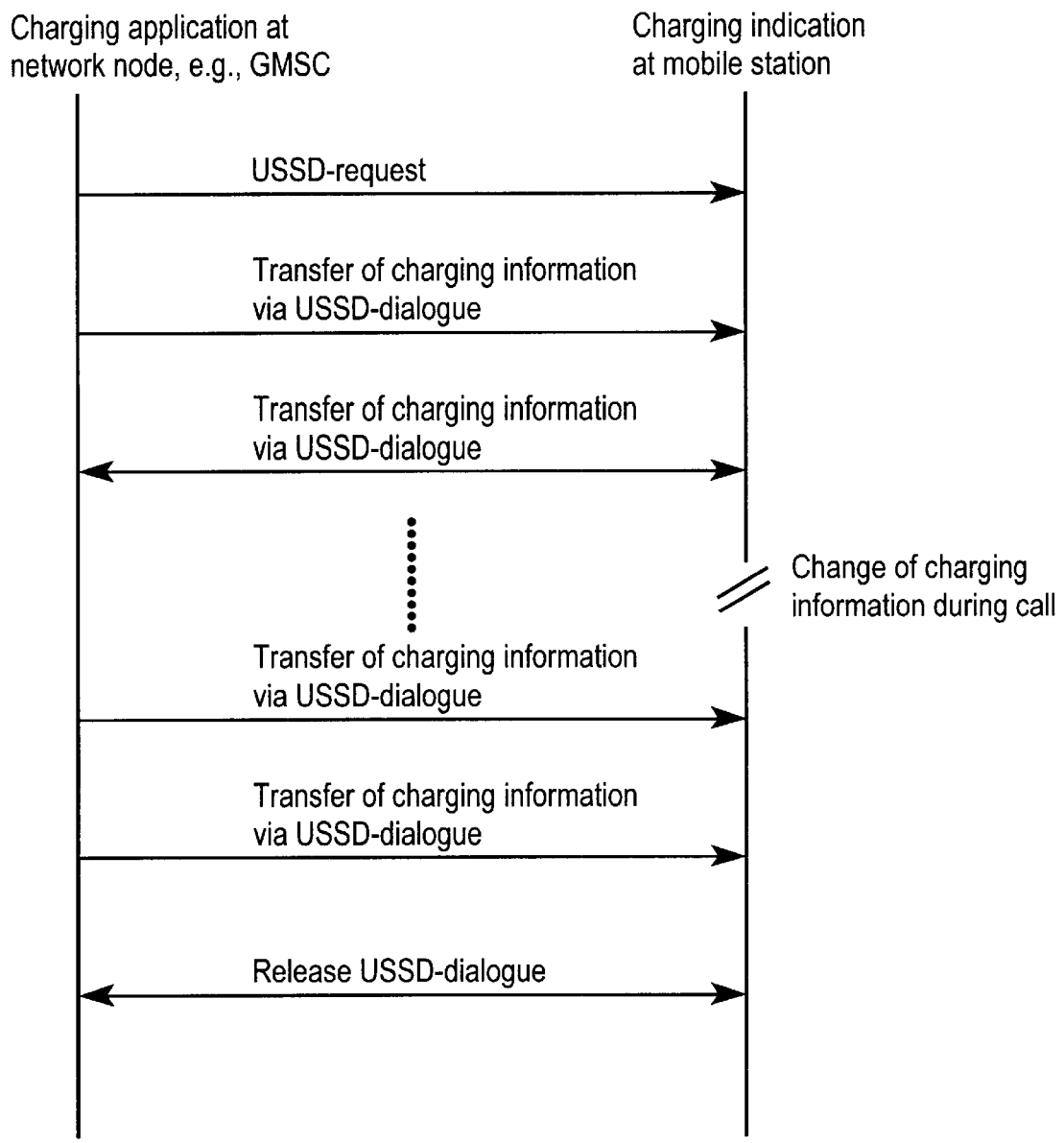
FIGS. 5a and b show the indication of charging information using unstructured supplementary service data dialogues according to a second embodiment of the present invention.

According to the embodiment of the present invention shown in FIG. 5a the charging unit 10-1, 10-2, 10-3, and 10-4 of at least one network node and the charging indication unit 6 at the mobile station MS exchange charging information at regular time intervals as unstructured supplementary data messages USSD. This embodiment leads to the further advantage that the overhead necessary to establish and release a USSD-dialogue may be avoided. Also, the determination of charging information is exclusively determined in the charging unit 10-1, 10-2, 10-3, and 10-4 of the network nodes so that the costs for the mobile station MS are minimized.

Figure 5B:
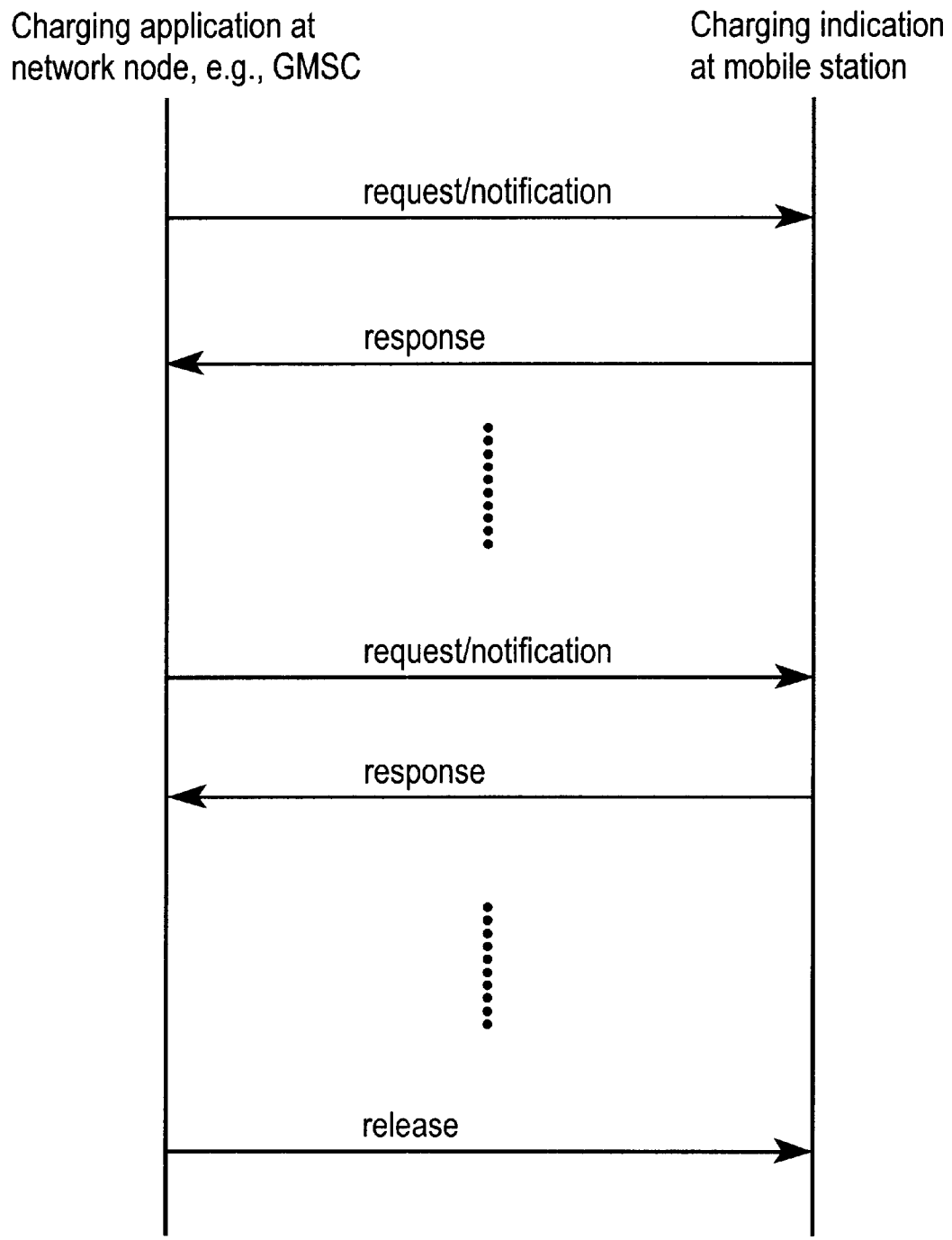

As shown in FIG. 5b, a further embodiment of the present invention is related to the case where the USSD-dialogue between the charging unit 10-1, 10-2, 10-3, and 10-4 of at least one network node and the charging indication unit 6 at the mobile station MS continuously exchange charging related information in the form of a request-notification initiated at the charging application and a response given by the mobile station MS, respectively. The advantage of this embodiment is that it enables improved accuracy of charging information indicated at the mobile station MS through a continued exchange of charging related information.

Figure 6:
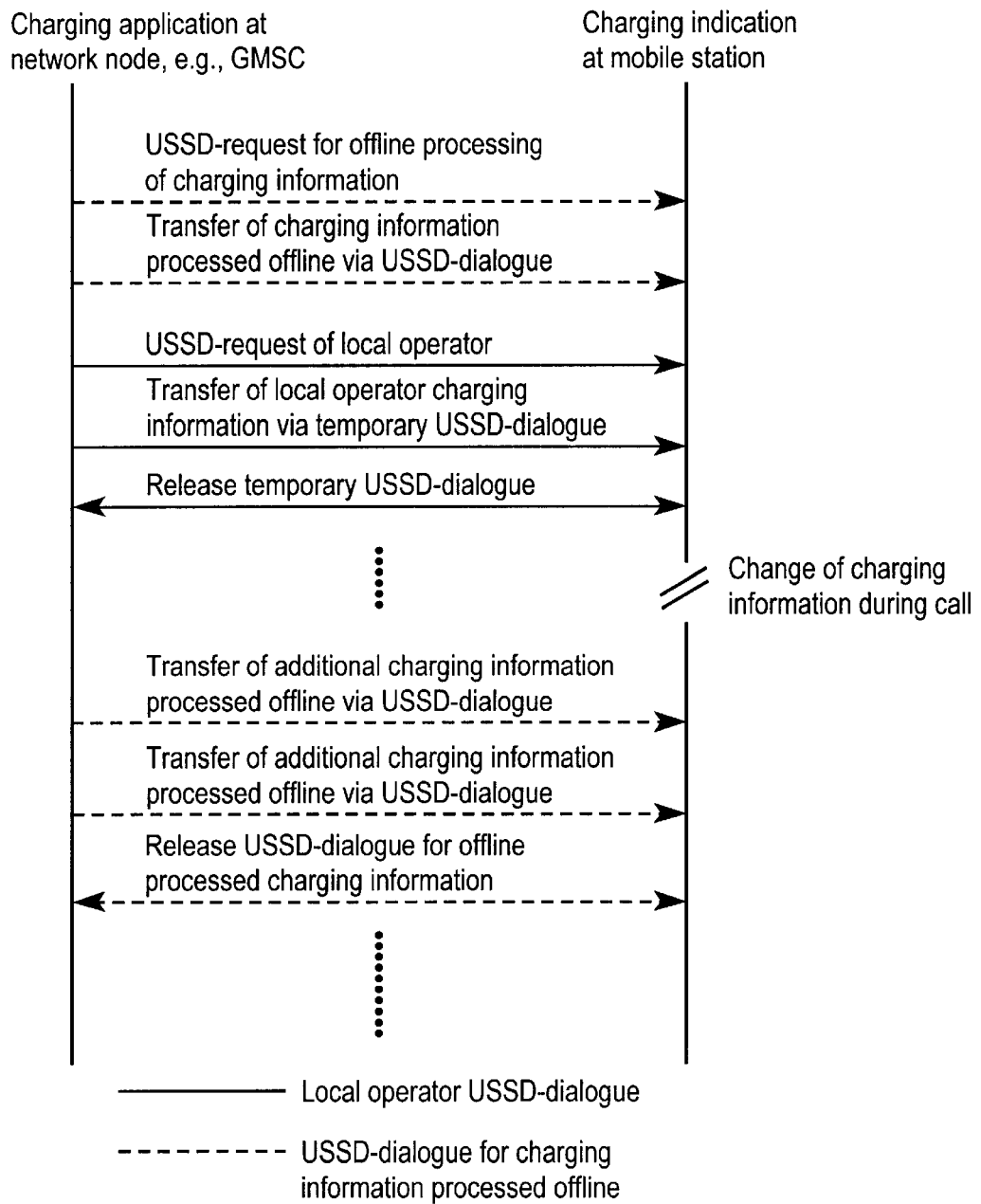
FIG. 6 shows the indication of charging information using unstructured supplementary service data dialogues according to a third embodiment of the present invention.

According to a further embodiment of the present invention shown in FIG. 6 the charging unit 10-1, 10-2, 10-3, and 10-4 of at least one network node and the charging indication unit 6 at the mobile station MS excecute several USSD-dialogues in parallel. In particular, local operator generated charging information is handled through the mobile station MS and charging information processed offline is handled through the network nodes. Usually, the charging information processed offline is related to call forwarding to the mobile station of the called party. This embodiment of the present invention allows to minimize costs for a call in that the user is also provided with the costs for, e.g., roaming in a visited home public land mobile network VPLMN and may therefore, e.g., refuse acceptance of a call.

Figure 7:
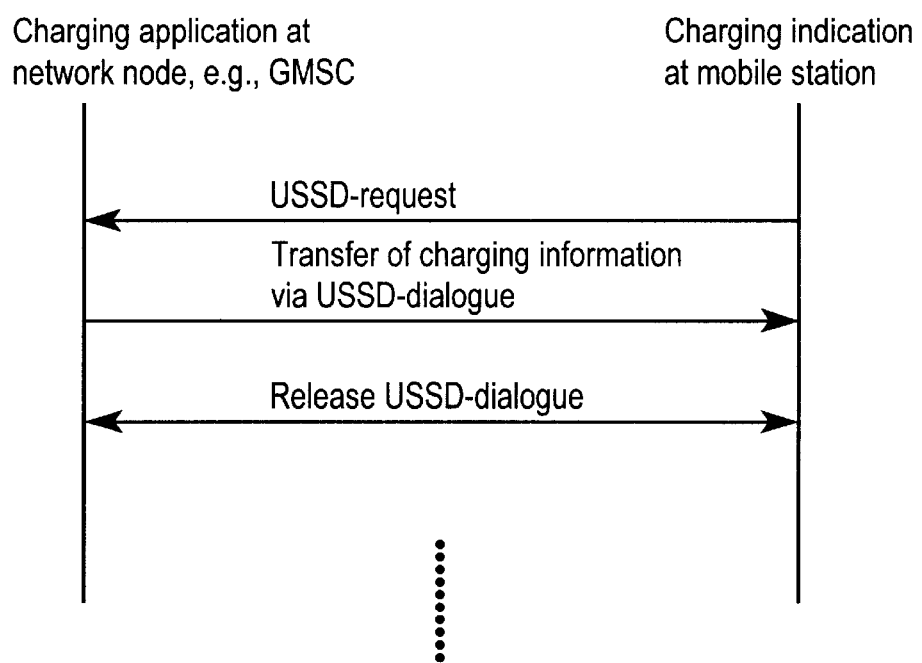
FIG. 7 shows the indication of charging information using unstructured supplementary service data dialogues according to a fourth embodiment of the present invention.

According to the embodiment of the present invention shown in FIG. 7 the charging indication unit 6 of the mobile station MS is adapted to receive the charging information as unstructured supplementary service data USSD before establishment of a service to derive an estimate of service charges on the basis on time-specific, location-specific, and service-specific criteria, respectively. Therefore, in case the costs estimated for a service are too high the user can avoid undesired charges.

Further, with all embodiments shown in FIG. 4 to FIG. 7 the mobile station MS preferably comprises a location information unit 8 to identify a cell identifier for a cell where the mobile station MS is currently roaming. The cell identifier is output via the USSD interface unit 4 to the network node where the charging information is determined. Typically, the location information unit 8 outputs management location information, e.g., the base station identity code BSIC code or GPS-related information. Further, the mobile station MS comprises a base station validity detection unit (not shown) to detect a change of the valid base station identity code BSIC during roaming of the mobile station MS.

According to these embodiments location information is transferred using an USSD-dialogue whenever the mobile station MS detects a change of the valid base station identity code BSIC or other management related information. This embodiment requires an additional database entry, e.g., in the visitor location register VLR within the visited public land mobile network VPLMN serving the mobile service switching centre MSC of the mobile station MS and the home location register HLR of the home public land mobile network HPLMN where the current location information may be stored and referred to by charging units 12-2 or 12-4 when needed.

Through the establishment of additional location information it is possible to achieve an extreme high accuracy with no hardware effort when charging information is determined at the network side. This allows to select the communication times with the lowest charges, in particular for services requiring no immediate delivery. Therefore, operator may attract calls by offering lower tariffs in low usage times.

In the following typical examples for the determination of charging information during roaming of a calling or called mobile station MS will be explained with respect to FIG. 8. In particular every calling subscriber is also referred to as A-subscriber and every called subscriber is referred to as B-subscriber.

Generally, for a mobile station terminating service the number given by the calling subscriber does not refer to a telephone line or a specific location but to the entry for the called party in the related home location register HLR. This record in the home location register HLR contains information necessary for finding the final destination of the call, i.e. the mobile services switching centre MSC and the related gateway mobile service switching center GMSC of the called party. As consequence, the final routing and therefore also the final charging can only be done after the interrogation of the home location register HLR.

Figure 8:
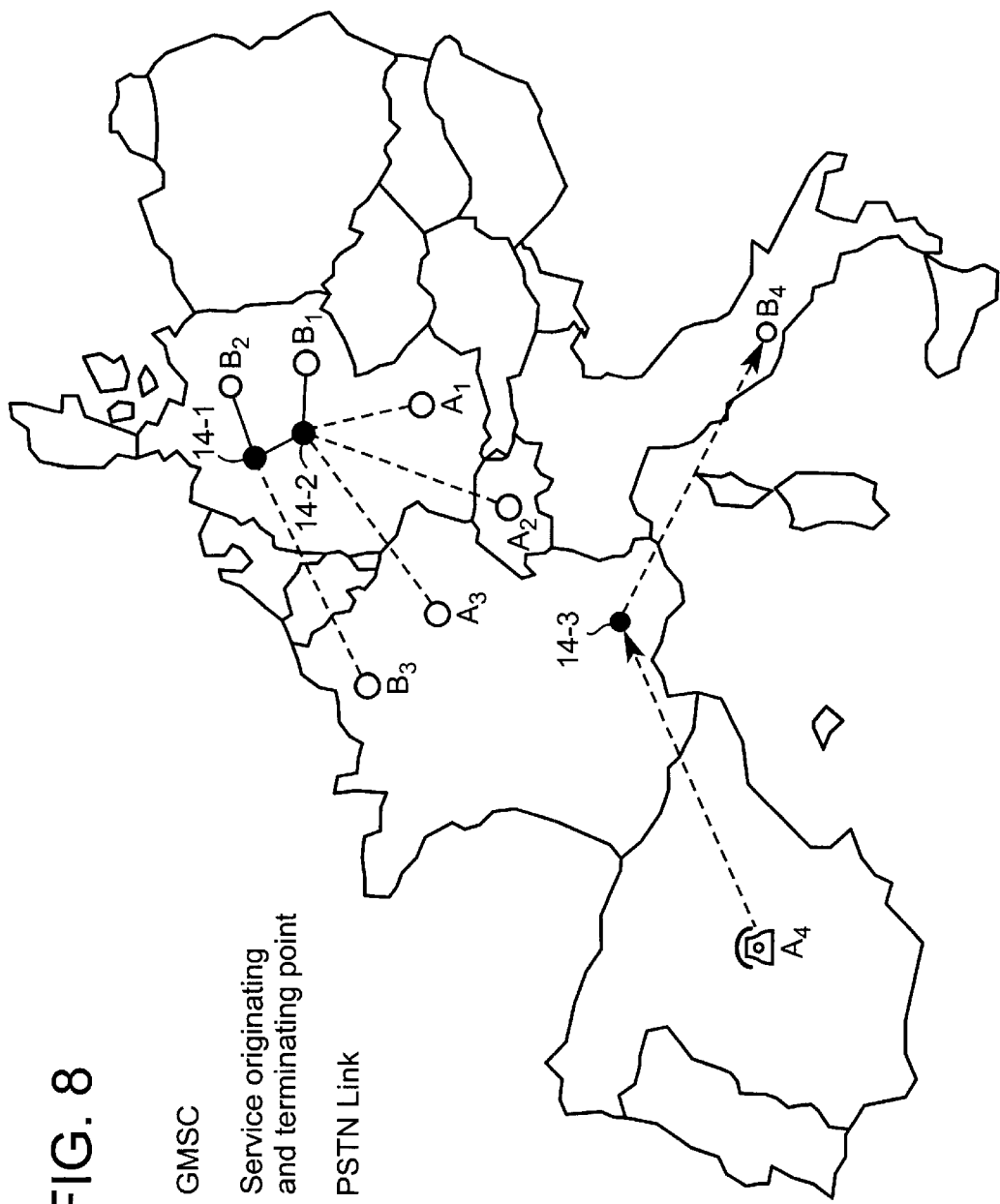
FIG. 8 shows a plurality of charging indication scenarios that may be handled through the embodiments of the present invention.
Figure 9:
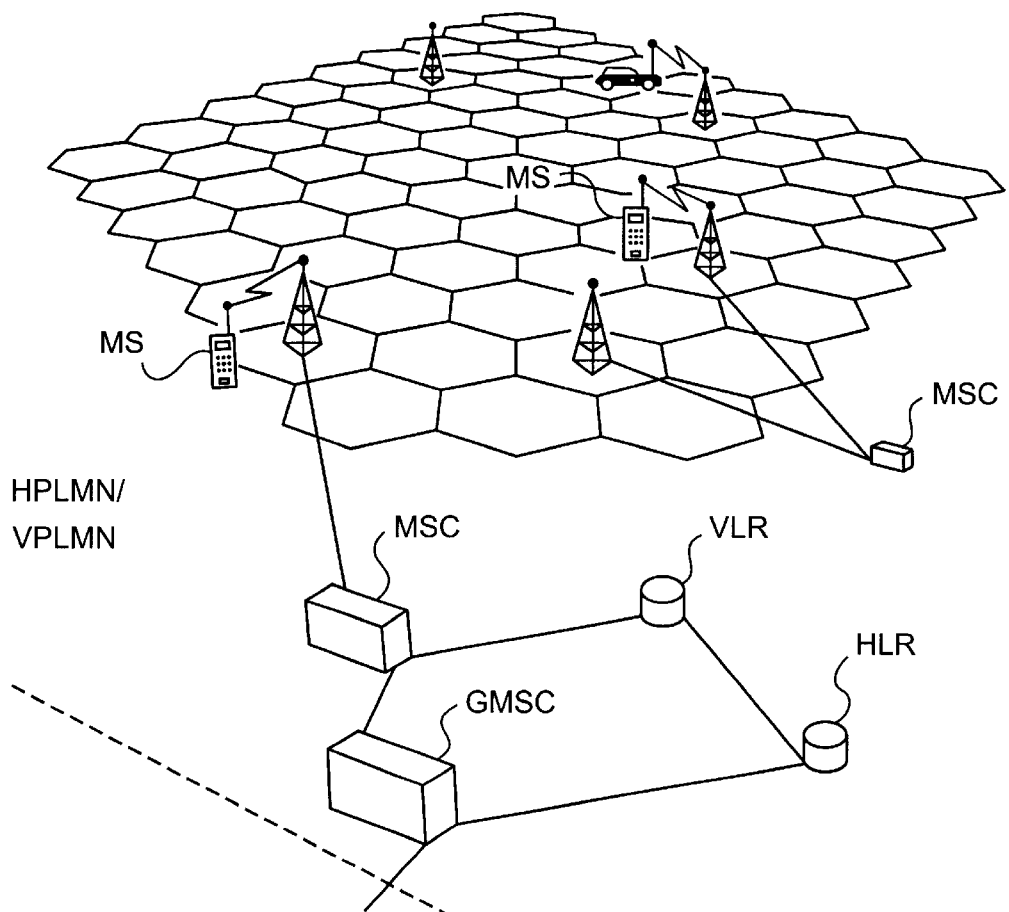
FIG. 9 shows basic components of a digital cellular communication network, in particular the GSM digital cellular communication network according to background art of the invention.

As shown in FIG. 8, this leads to a splitting of the call/service route into two parts: from the call originating point Ai to the interrogation point 14-1, 14-2, and 14-3, respectively, and from the interrogation point 14-1, 14-2, 14-3 to the final destination Bi of the call. Here, the first part of the routing is done only with the information deriveable from the called number independent of the called party location. The reason for this is that for the first part, e.g., the gateway mobile service switching centre GMSC operating as interogation point 14-1, 14-2, and 14-3 is able to determine the home location register HLR of the called party rapidly. The result of the interrogation of this home location register HLR is the identity of the called subscriber and his current location for either a direct connection or a call forwarding. This leads to different situations, as will be shown in the following.

According to the simpliest case, A1->B1, both the calling mobile station A1 and the called mobile station B1 are linked to the same interrogation point 14-2 and do neither roam in the network of another service provider nor abroad. Here, the present invention is directly applicable as outlined above.

Further, as shown in FIG. 8 the calling party may roam abroad, e.g., according to A2->B1. Here, the charging units 10-1, 10-2, 10-3, 10-4 in the network nodes or the charging indication unit 6 at the calling mobile station A2 would add additional costs for the international forwarding A2->14-2 which would directly be indicated to the user of the mobile station A2.

Further, as shown in FIG. 8 the calling party A1 and the called party B2 may be related to different interrogation points 14-1 and 14-2, respectively. Here, according to the present invention it is possible to indicate the exact amount of charged costs since these costs are not only based on the time used for a service as with the Advice of charge AoC supplementary service but also on compensations between the different network operators. However, in case the charging information is determined in those network nodes serving as intergation points 14-1 and 14-2, e.g., the gateway mobile service switching centres, the charging information is directly available.

Further, as shown in FIG. 8 it may be possible that both the calling party A1 and the called party B2 roam in the same country. In dependence on national regulations it may be possible that the calling party and the called party may select between plurality of service providers. Thus, according to the present invention the selection of the provider for optimal charging conditions can be established through interrogation before establishing a service.

Further, as shown in FIG. 8, the called party B3 may roam abroad so that costs are not only levied on the calling party, e.g., A1 but also on the called party B3. Since according to the present invention it is possible to indicate charging information not only to calling party but also to the called party B3 the called party may decide whether to pay for the forwarding of the service between the related interrogation point 14-1 and the location B3 abroad.

An even more complicated case also shown in FIG. 8 arises in case not only the called but also the calling party roam abroad, e.g., A2->B3 or A3->B3. Here, both parties will be charged for service forwarding leading to a corresponding charging indication. Further, if in certain cases it is cheaper to re-direct a call a call back indication may be carried out easily. In particular the case A3->B3 shown in FIG. 8 is very costly since services are forwarded from one country to another country lying abroad and then back to the same country again. Here, it is useful to indicate a change to a local operator or even to the local PSTN-network to avoid unnecessary costs. While at first sight the operators of the digital cellular communication networks linking A3 and B3 might loose some revenues, the overall attractiveness of these digital cellular communication networks may be raised in case users thereof are not charged unnecessary costs.

Further, as shown in FIG. 8, the present invention is not restricted to, e.g., digital cellular communication networks of the GSM type, but may easily be extended to other networks such as the PSTN network, the ISDN-network, and so on. One option is to implement the charging unit deriving the charging information into the interrogation point, e.g., the gateway mobile service switching centre GMSC connecting the digital cellular communication networks of the GSM type and the PSTN network.

What is claimed is:

1. Mobile station for use in a digital cellular communication network supporting unstructured supplementary service data messages, comprising:

service means to perform services at the mobile station provided through the digital cellular communication network, unstructured supplementary service data dialog means to establish a transaction channel for unstructured supplementary service data messages between the digital cellular communication network and the mobile station, and charging indicating means adapted to receive actual charging costs as unstructured supplementary service data messages via the unstructured supplementary service data dialog means, wherein the charging indication means is adapted to indicate actual charging costs provided through the local operator and actual charging costs processed offline through establishment of at least two unstructured supplementary data messages during roaming of the mobile station in a visited digital cellular communication network.

2. Mobile station according to claim 1, wherein the charging indication means is adapted to receive actual charging costs at regular time intervals as unstructured supplementary data messages.

3. Mobile station according to claim 1, wherein the charging indication means is adapted to further receive the charging rates as unstructured supplementary service data messages before establishment of a service to derive an estimate of service charges on the basis of time-specific, location-specific, and service-specific criteria, respectively.

4. Mobile station according to claim 1, which further comprises location information means (8) adapted to identify a cell identifier for a cell where the mobile station (MS) is currently roaming and to output the cell identifier via the unstructured supplementary service data dialogue means (4).

5. Mobile station according to claim 4, wherein the local information means (8) is adapted to use location management information (GPS, BSIC) within a GSM digital cellular communication network.

6. Mobile station according to claim 4, which further comprises a base station validity detection means to detect a change of the valid base station identity code (BSIC) during roaming of the mobile station (MS) and that the local information means (8) is adapted to output the updated base station identity code (BSIC).

7. Digital cellular communication network with at least one public land mobile network, comprising:

at least one mobile services switching center as first network node linked to at least one base station subsystem in the digital cellular communication network and adapted to transfer unstructured supplementary service data messages to at least one mobile station roaming in the digital cellular communication network, at least one home location register as second network node adapted to store permanent subscriber data and to output this permanent subscriber data to the mobile services switching center, at least one visitor location register as third network node adapted to store temporary subscriber data and output this temporary subscriber data to the mobile services switching center, at least one gateway mobile service switching center as fourth network node adapted to achieve a link between the mobile services switching center and external communications networks being linked to the digital cellular communication network, wherein at least one network node comprises a charging means adapted to calculate actual charging costs and transfer them to the mobile station using unstructured supplementary service data messages, and the mobile station supports unstructured supplementary service data messages and comprises:
service means to perform services at the mobile station provided through the digital cellular communication network,
unstructured supplementary service data dialog means to establish a transaction channel for unstructured supplementary service data messages between the digital cellular communication network and the mobile station, and
charging indicating means adapted to receive actual charging costs as unstructured supplementary service data messages via the unstructured supplementary service data dialog means, wherein
the charging indication means is adapted to indicate actual charging costs provided through the local operator and actual charging costs processed offline through establishment of at least two unstructured supplementary data dialogues during roaming of the mobile station in a visited digital cellular communication network, and
local operator generated charging information is handled through the mobile station and that actual charging costs processed offline are handled through the network node.

8. Digital cellular communication network according to claim 7, wherein the charging indication means is adapted to receive actual charging costs at regular time intervals as unstructured supplementary data messages.

9. Digital cellular communication network according to claim 7, wherein the charging indication means (6) is adapted to receive the charging information as unstructured supplementary service data messages before establishment of a service to derive an estimate of service charges on the basis of time-specific, location-specific, and service-specific criteria, respectively.

10. Digital cellular communication network according to claim 7, which further comprises location information means (18) adapted to identify a cell identifier for a cell where the mobile station (MS) is currently roaming and to output the cell identifier via the unstructured supplementary service data dialog means.

11. Digital cellular communication network according to claim 10, wherein the local information means (8) is adapted to use location management information (GSP, BSIC) within a GSM digital cellular communication network.

12. Digital cellular communication network according to claim 7, wherein the charging information processed offline is related to call forwarding to the mobile station of a called party.

13. Digital cellular communication network according to claim 7, wherein the charging means (10-1, 10-2, 10-3, 10-4) comprises a cell identifier storage means to store the cell identifier of the mobile station (MS).

14. Digital cellular communication network according to claim 13, wherein the cell identifier stored in the cell identifier storage means is updated on request of an application running in the network node (HLR, VLR, MSC, GMSC) each time the cell identifier changes due to roaming of the calling mobile station.

15. Digital cellular communication network according to claim 14, wherein the cell identifier is implemented using location management information (GPS, BSIC) in a digital cellular communication network of the GSM type.

16. Method to provide charging specific information in a digital cellular communication network supporting unstructured supplementary service data messages, comprising the steps:
establishing at least one transaction channel for unstructured supplementary service data messages between a calling mobile roaming in the digital cellular communication network and a node within said network,
providing actual charging costs generated at a network node using unstructured supplementary service data messages on the basis of location information received for the calling mobile station and a called mobile station, wherein local operator specific charging information is generated in the calling mobile station on the basis of charging information transferred through the use of unstructured supplementary service data messages to the calling mobile station in a visited digital cellular communication network.

17. Method according to claim 16, wherein the actual charging costs are also based on the kind of service to be charged.

18. Method according to claim 16, wherein the actual charging costs also based on the time of service provision.

19. Method according to claim 16, wherein location information is transferred from the calling mobile station (MS) on request from the network node to optimize service charges for either mobile originating services or mobile terminating services, respectively.

20. Method according to claim 19, wherein the location information is automatically transferred from the calling mobile station (MS) each time the location information changes.

* * * * *